(12) United States Patent
Tsuda

(10) Patent No.: US 6,661,615 B2
(45) Date of Patent: Dec. 9, 2003

(54) APPARATUS AND METHOD FOR DEPOPULATING A DISK DRIVE HEAD STACK ASSEMBLY BY UTILIZING AN OVERMOLDED ACTUATOR

(75) Inventor: Shingo Tsuda, Yokohama (JP)

(73) Assignee: Hitachi Global Storage Technologies Netherlands B.V. (NL)

( * ) Notice: Subject to any disclaimer, the term of this patent is extended or adjusted under 35 U.S.C. 154(b) by 138 days.

(21) Appl. No.: 10/004,509

(22) Filed: Nov. 2, 2001

(65) Prior Publication Data

US 2003/0086212 A1 May 8, 2003

(51) Int. Cl.$^7$ ............................................... G11B 21/16
(52) U.S. Cl. ................... 360/265.7; 360/265.9
(58) Field of Search ..................... 360/265.7, 265.9, 360/266, 266.1, 244.5, 245.2, 244.6

(56) References Cited

U.S. PATENT DOCUMENTS

| | | | | |
|---|---|---|---|---|
| 5,870,254 A | * | 2/1999 | Baserman et al. | 360/244.6 |
| 6,532,137 B2 | * | 3/2003 | Huang et al. | 360/265.7 |
| 6,538,853 B1 | * | 3/2003 | Williams et al. | 360/265.9 |
| 2001/0015875 A1 | * | 8/2001 | Ohta et al. | 360/254.8 |

OTHER PUBLICATIONS

"Cost Reduction Actuator," Apr. 1, 1994, IBM Technical Disclosure Bulletin, vol. No. 37, Iss. No. 4A, pp. 119–120.*
"DEPOP Head Arm Assembly for Hard Disk Drive,"Sep. 1, 1994, IBM Disclosure Bulletin, vol. No. 37, Iss. No. 9, pp. 35–36.*
"Special One Disk Hard Drive using Magneto–Resistive Head Technology," Apr. 1, 1995, IBM Technical Disclosure Bulletin, vol. No. 38, Iss. No. 4, pp. 117–118.*
"Dummyhead Re–arrangement for Solving Actuator Resonance Problem," Feb. 1, 2000, UK IBM Technical Disclosure Bulletin, Iss. No. 430, p. 412.*
"Head Position of De–pop Actuator for Test Yield Improvement," Apr. 1, 2001, IBM Technical Disclosure Bulletin, Iss. No. 444, p. 695.

* cited by examiner

*Primary Examiner*—William Klimowicz
(74) *Attorney, Agent, or Firm*—Robert B. Martin; Bracewell & Patterson, L.L.P.

(57) ABSTRACT

A head stack assembly for a hard disk drive has an actuator comb body, a coil yoke, at least one actuator arm, and a prosthesis. The prosthesis is an artificial or replacement arm and is preferably identical in profile and thickness as the actuator arm, except for some or all of the balance holes in the actuator arm. This configuration eliminates the need to provide the prosthesis with a real or dummy head in order to balance the actuator, thereby reducing cost. A common stamping die and a common molding die are used for both the arm and the prosthesis, which further reduces the cost of manufacturing.

13 Claims, 3 Drawing Sheets

APPARATUS AND METHOD FOR DEPOPULATING A DISK DRIVE HEAD STACK ASSEMBLY BY UTILIZING AN OVERMOLDED ACTUATOR

BACKGROUND OF THE INVENTION

1. Technical Field

The present invention relates in general to an improved disk drive, and in particular to an improved apparatus and method for depopulating a head stack assembly in a disk drive by utilizing an overmolded actuator.

2. Description of the Prior Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, two or three disks are stacked vertically on a common spindle that is turned by a disk drive motor at several thousand revolutions per minute (rpm).

A typical HDD also utilizes an actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions on its air bearing surface (ABS) that enables the slider to fly at a constant height close to the disk during operation of the disk drive. A slider is associated with each side of each platter and flies just over the platter's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly, sometimes referred to as the head stack assembly, is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop directly over the desired track.

For some applications, such as disk drives with fewer disks, a head stack assembly having a lesser number of arms is needed. In these situations, the manufacturing techniques typically require separate tooling, such as stamping and molding dies, for each different type of head stack assembly. Such tooling is quite expensive and can significantly affect assembly line flexibility. Thus, an improved apparatus and method for increasing head stack assembly flexibility while reducing the costs of manufacturing is needed.

SUMMARY OF THE INVENTION

One embodiment of a head stack assembly for a hard disk drive comprises an actuator comb body, a coil yoke, at least one actuator arm, and a prosthesis. The prosthesis is an artificial or replacement arm for the actuator arm and is preferably identical in profile and thickness as the actuator arm, except for some or all of the balance holes in the actuator arm. This configuration eliminates the need to provide the prosthesis with a real or dummy head in order to balance the actuator, thereby reducing cost. A common stamping die and a common molding die are used for both the arm and the prosthesis, which further reduces the cost of manufacturing. In addition, the invention allows for common usage of assembly tools in the hard disk drive assembly line.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT OF THE PRESENT INVENTION

Figure 1:
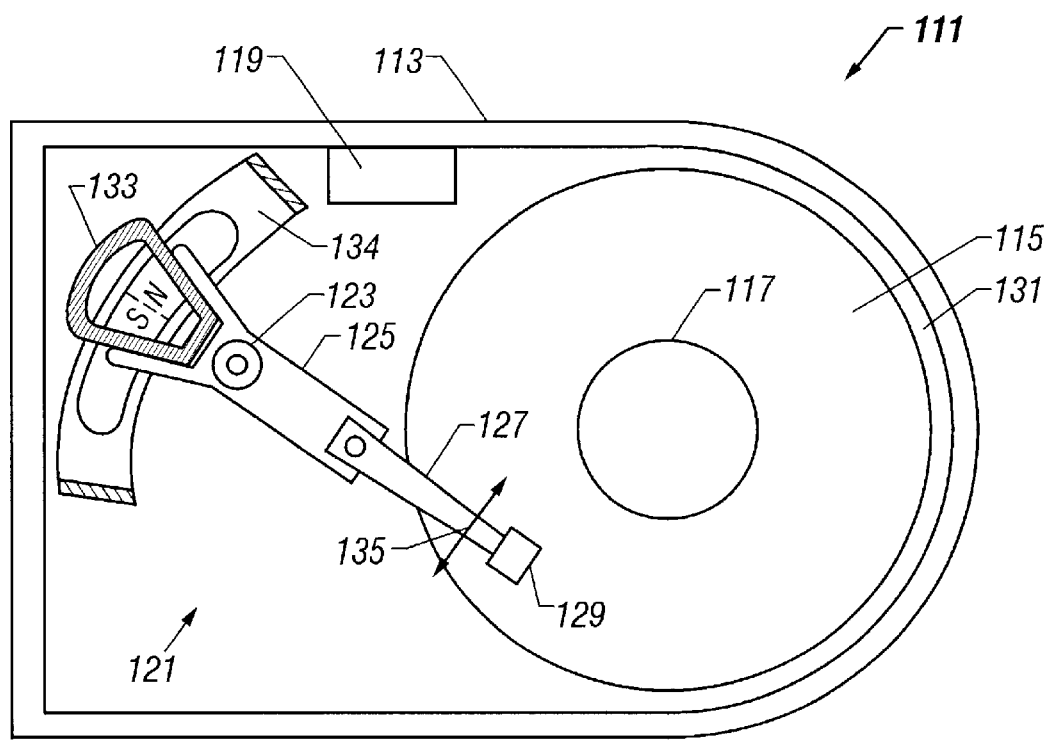
FIG. 1 is a plan view of one embodiment of a disk drive constructed in accordance with the present invention.

Referring to FIG. 1, a schematic drawing of one embodiment of an information storage system comprising a magnetic hard disk file or drive 111 for a computer system is shown. Drive 111 has an outer housing or base 113 containing a plurality of stacked, parallel magnetic disks 115 (one shown) which are closely spaced apart. Disks 115 are rotated by a spindle motor assembly 131 having a central drive hub 117. An actuator 121 comprises a head stack assembly having a plurality of parallel actuator arms 125 (one shown) in the form of a comb or E-block that is pivotally mounted to base 113 about a pivot assembly 123. A controller 119 is also mounted to base 113 for selectively moving the comb of arms 125 relative to disks 115.

In the embodiment shown, each arm 125 has extending from it at least one cantilevered load beams or suspensions 127, a magnetic read/write transducer or head 129 mounted on a slider secured to a flexure that is flexibly mounted to each suspension 127. The read/write heads 129 magnetically read data from and/or magnetically write data to disks 115. The level of integration called head gimbal assembly is head 129 and the slider are mounted on suspension 127. Suspensions 127 have a spring-like quality which biases or urges the slider against the disk to enable the creation of the air bearing film between the slider and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves head gimbal assemblies 129 radially across tracks on the disks 115 until the heads 129 settle on the target tracks. The head gimbal assemblies operate in a conventional manner and always move in unison with one another, unless drive 111 uses multiple independent actuators (not shown) wherein the arms can move independently of one another.

The head stack assembly of actuator 121 may be constructed in several different manners. In the preferred embodiment of the present invention, the head stack assembly is formed by utilizing an overmold carriage. In an overmold carriage, the arms 125 and coil 133 are joined or bonded together by, for example, insertion molding or pressure infusion casting. With infusion casting, molten material is injected into a die cavity containing preforms of the desired E-block shape, as shown in FIGS. 2–6.

Figure 2:
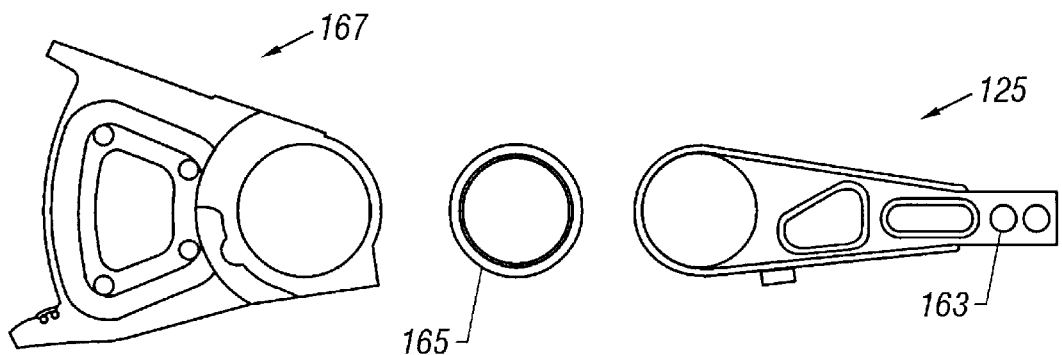
FIG. 2 is an exploded plan view of a head stack assembly of the disk drive of FIG. 1.
Figure 3:
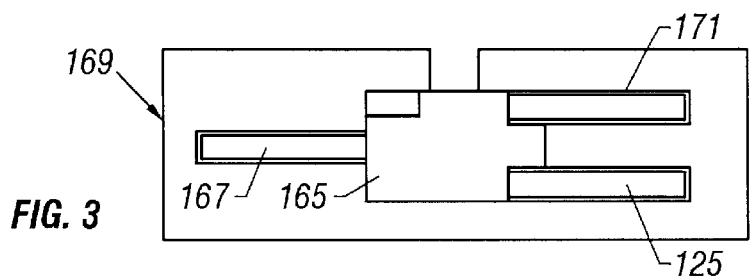
FIG. 3 is a sectional side view of the head stack assembly of FIG. 2 located within a mold.
Figure 4:
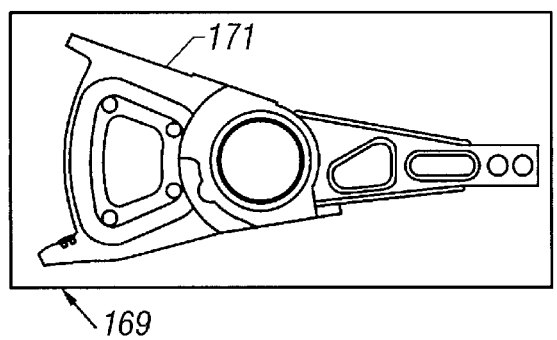
FIG. 4 is a top view of the head stack assembly and mold of FIG. 3.
Figure 5:
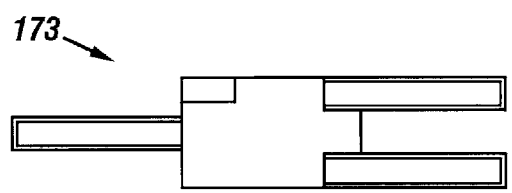
FIG. 5 is a side view of a molded head stack assembly.
Figure 6:
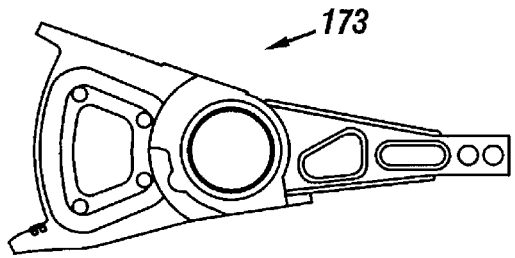
FIG. 6 is a top view of the molded head stack assembly of FIG. 5.

FIG. 2 shows the basic components of the head stack assembly, wherein an arm 125 having a tip opening 163 is coupled to spacer ring 165 and coil yoke 167. Once assembled, these components are placed within a mold 169 (FIGS. 3 and 4) having a cavity that is slightly larger than the assembly, thus leaving a substantially uniform cavity 171 around the assembly. The desired molten material is then injected into the mold and surrounds the assembly to fill any voids within the mold. The end product (FIGS. 5 and 6) is the head stack assembly 173 and forms the basis for actuator 121.

Figure 7:
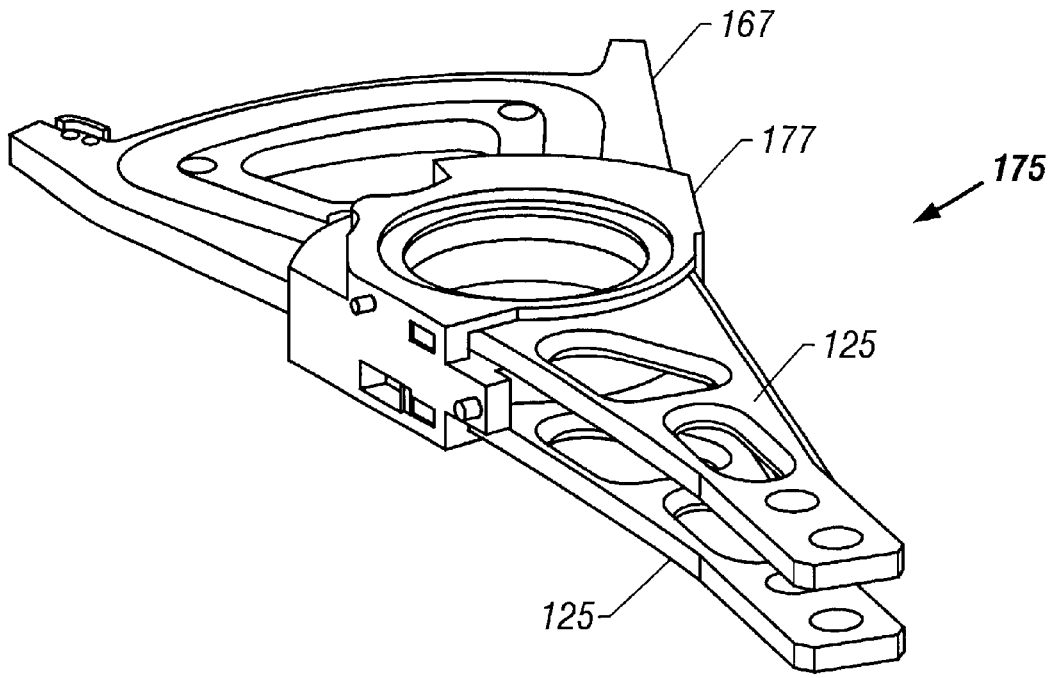
FIG. 7 is an isometric view of a prior art head stack assembly.

Referring now to FIG. 7, a conventional head stack assembly 175 is shown. Head stack assembly 175 comprises an actuator comb body 177, coil yoke 167, and a series (two shown) of identical actuator arms 125. In a conventional disk drive, each arm 125 is equipped with at least one suspension and head gimbal assembly regardless of how many of the arms 125 are actually needed. Thus, in a disk drive application having a single disk that is also single-sided, for example, only one arm with a single suspension and head gimbal assembly is needed. The other arm of FIG. 7 is not needed, but it must be utilized in order to allow the complete head stack assembly 175 to be manufactured with the same molds and dies utilized for other applications. Moreover, in order for the end product actuator to be properly balanced, a "dummy" suspension or head gimbal assembly must be attached to the unused arm to maintain the balance and performance of the disk drive. Thus, a need exists to efficiently and effectively "depopulate" the head stack assemblies of their excess actuator arms and attachments.

Figure 8:
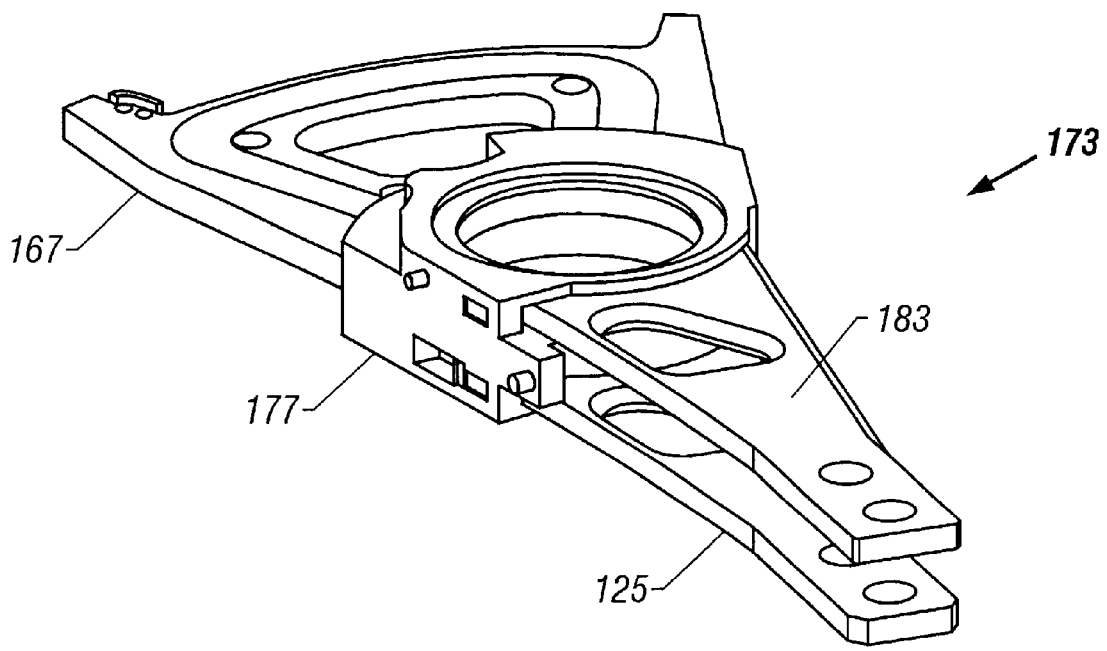
FIG. 8 is an isometric view of a head stack assembly constructed in accordance with the present invention.

In order to overcome this problem, the solution of the present invention depicted in FIG. 8 is presented. FIG. 8 depicts a head stack assembly 173 comprising an actuator comb body 177, a voice coil motor yoke 167, at least one actuator arm 125, and a "dummy" arm or prosthesis 183. Prosthesis 183 is an artificial or replacement device for arm 125 and, preferably, is identical or substantially identical in both profile and in thickness as arm 125, except for some or all of the balance holes in arm 125, as shown. This configuration eliminates the need to provide prosthesis 183 with a real or dummy attachment, such as a suspension and head gimbal assembly, in order to balance the actuator, thereby reducing cost. As a result, prosthesis 183 does not perform all of the functions of arm 125 during the operation of the disk drive. However, by keeping the profile identical, a common stamping die and common molding die can be used for both arm 125 and prosthesis 183, which further reduces the cost of manufacturing. Although head stack assembly 173 is shown with only one arm 125 and one prosthesis 183, any number and combination may be utilized depending upon the specific application for which the assembly is intended to be used in depopulating a head stack assembly.

The present invention has several advantages. By keeping the profile of the prosthesis identical to that of the arm, common stamping and molding dies can be used. This advantage can save approximately $50,000 to $150,000 per stamping die, and approximately $20,000 to $100,000 per molding die. Furthermore, additional parts such as dummy heads (approximately $0.10 to $0.20 per part) are not required to balance the actuator, again resulting in a cost reduction. Moreover, the invention allows for common usage of assembly tools in the hard disk drive assembly line.

While the invention has been shown or described in only some of its forms, it should be apparent to those skilled in the art that it is not so limited, but is susceptible to various changes without departing from the scope of the invention.

What is claimed is:

1. A head stack assembly, comprising:
   an actuator body;
   an actuator arm mounted to the body;
   a prosthesis mounted to the body; and wherein
      the actuator arm and the prosthesis each have balance holes, and the prosthesis has fewer balance holes than the actuator arm.

2. The head stack assembly of claim 1 wherein the prosthesis is an artificial actuator arm.

3. The head stack assembly of claim 1 wherein the prosthesis has a substantially identical profile as the actuator arm.

4. The head stack assembly of claim 1 wherein the prosthesis is substantially identical in thickness as the actuator arm.

5. The head stack assembly of claim 1 wherein only the actuator arm has a read/write head.

6. A head stack assembly, comprising:
   an actuator comb body;
   a voice coil motor yoke mounted to and extending from the body;
   at least one actuator arm mounted to and extending from the body opposite the yoke, said at least one actuator arm having a read/write head;
   at least one prosthesis mounted to and extending from the body opposite the yoke, wherein the prosthesis has a substantially identical profile as said at least one actuator arm; and wherein said at least one actuator arm and the prosthesis each have balance holes, and the prosthesis has fewer balance boles than said at least one actuator arm.

7. The head stack assembly of claim 6 wherein the prosthesis is an artificial actuator arm.

8. The head stack assembly of claim 6 wherein the prosthesis is also substantially identical in thickness as said at least one actuator arm.

9. The head stack assembly of claim 6 wherein only said at least one actuator arm has a read/write head.

10. A disk drive, comprising:

a base;

a disk rotatably mounted to the base;

an actuator pivotally mounted to the base; wherein the actuator further comprises:

a head stack assembly having an actuator comb body with an actuator arm and a prosthesis;

a read/write head mounted only to the actuator arm for reading data from and writing data to the disk; and wherein the actuator arm and the prosthesis each have balance holes, and the prosthesis has fewer balance holes than the actuator arm.

11. The disk drive of claim 10 wherein the prosthesis is an artificial actuator arm.

12. The disk drive of claim 10 wherein the prosthesis has a substantially identical profile as the actuator ann.

13. The disk drive of claim 10 wherein the prosthesis is substantially identical in thickness as the actuator arm.

* * * * *

UNITED STATES PATENT AND TRADEMARK OFFICE
CERTIFICATE OF CORRECTION

PATENT NO. : 6,661,615 B2
DATED : December 9, 2003
INVENTOR(S) : Tsuda

It is certified that error appears in the above-identified patent and that said Letters Patent is hereby corrected as shown below:

<u>Column 4,</u>
Line 50, please remove the word "bead" and insert the word -- head -- between the words "the" and "stack".
Line 55, please remove the word "ann" and insert the word -- arm --.

<u>Column 6,</u>
Line 12, please remove the word "ann" and insert the word -- arm --.

Signed and Sealed this

Twenty-third Day of March, 2004

JON W. DUDAS
*Acting Director of the United States Patent and Trademark Office*